(12) United States Patent
Tanaka et al.

(10) Patent No.: US 6,830,536 B2
(45) Date of Patent: Dec. 14, 2004

(54) METHOD AND APPARATUS FOR CONTROLLING THE CYLINDER TORQUE OF A COMBUSTION ENGINE

(75) Inventors: Masaaki Tanaka, Susono (JP); Yasushi Ito, Susono (JP); Shoji Katsumata, Gotenba (JP); Keiji Yoeda, Numazu (JP); Hideyuki Nishida, Susono (JP); Makoto Ogiso, Susono (JP); Isao Matsumoto, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/372,783

(22) Filed: Feb. 26, 2003

(65) Prior Publication Data

US 2003/0130090 A1 Jul. 10, 2003

Related U.S. Application Data

(62) Division of application No. 09/810,622, filed on Mar. 19, 2001, now Pat. No. 6,546,910.

(30) Foreign Application Priority Data

Mar. 21, 2000 (JP) ........................................ 2000-078954

(51) Int. Cl.$^7$ .......................... B60K 41/04; F02D 14/00
(52) U.S. Cl. ..................................... 477/110; 123/347
(58) Field of Search ................................. 477/107, 109, 477/110, 43, 44; 123/478, 347, 348, 198 F

(56) References Cited

U.S. PATENT DOCUMENTS

| | | | |
|---|---|---|---|
| 4,039,061 A | 8/1977 | Pruvot et al. | 192/4 A |
| 4,226,222 A | 10/1980 | Kohama et al. | 123/568 |
| 5,056,378 A | * 10/1991 | Aimone et al. | 477/109 |
| 5,184,577 A | * 2/1993 | Kato et al. | 123/90.15 |
| 5,305,662 A | * 4/1994 | Togai et al. | 477/43 |
| 5,496,229 A | * 3/1996 | Miyamoto | 477/111 |
| 5,947,863 A | 9/1999 | Grob et al. | |
| 6,024,059 A | 2/2000 | Kamimaru et al. | 123/90.11 |
| 6,027,425 A | 2/2000 | Sakaguchi et al. | |
| 6,155,232 A | 12/2000 | Shibagaki | 123/436 |

FOREIGN PATENT DOCUMENTS

| | | | |
|---|---|---|---|
| EP | 0 420 443 A1 | 4/1991 | |
| EP | 1 063 407 A1 | 12/2000 | |
| JP | A-2-294509 | 12/1990 | |
| JP | 403005248 A | * 1/1991 | 477/110 |
| JP | A-4-303153 | 10/1992 | |
| JP | A-10-37727 | 2/1998 | |
| JP | A-11-82090 | 3/1999 | |
| JP | A-11-117778 | 4/1999 | |
| JP | B2-2924475 | 5/1999 | |

* cited by examiner

Primary Examiner—Roger Pang
(74) Attorney, Agent, or Firm—Oliff & Berridge, PLC

(57) ABSTRACT

A method and apparatus for controlling an internal combustion engine. A target cylinder torque required of one of a plurality of cylinders is individually calculated in accordance with a target engine torque, and a timing for opening and closing each of a plurality of intake and exhaust valves in each of the plurality of cylinders is determined in accordance with the target cylinder torque. Thereby the torque of the internal combustion engine is individually controlled for each of the plurality of cylinders.

7 Claims, 8 Drawing Sheets

COMBUSTION CHAMBER

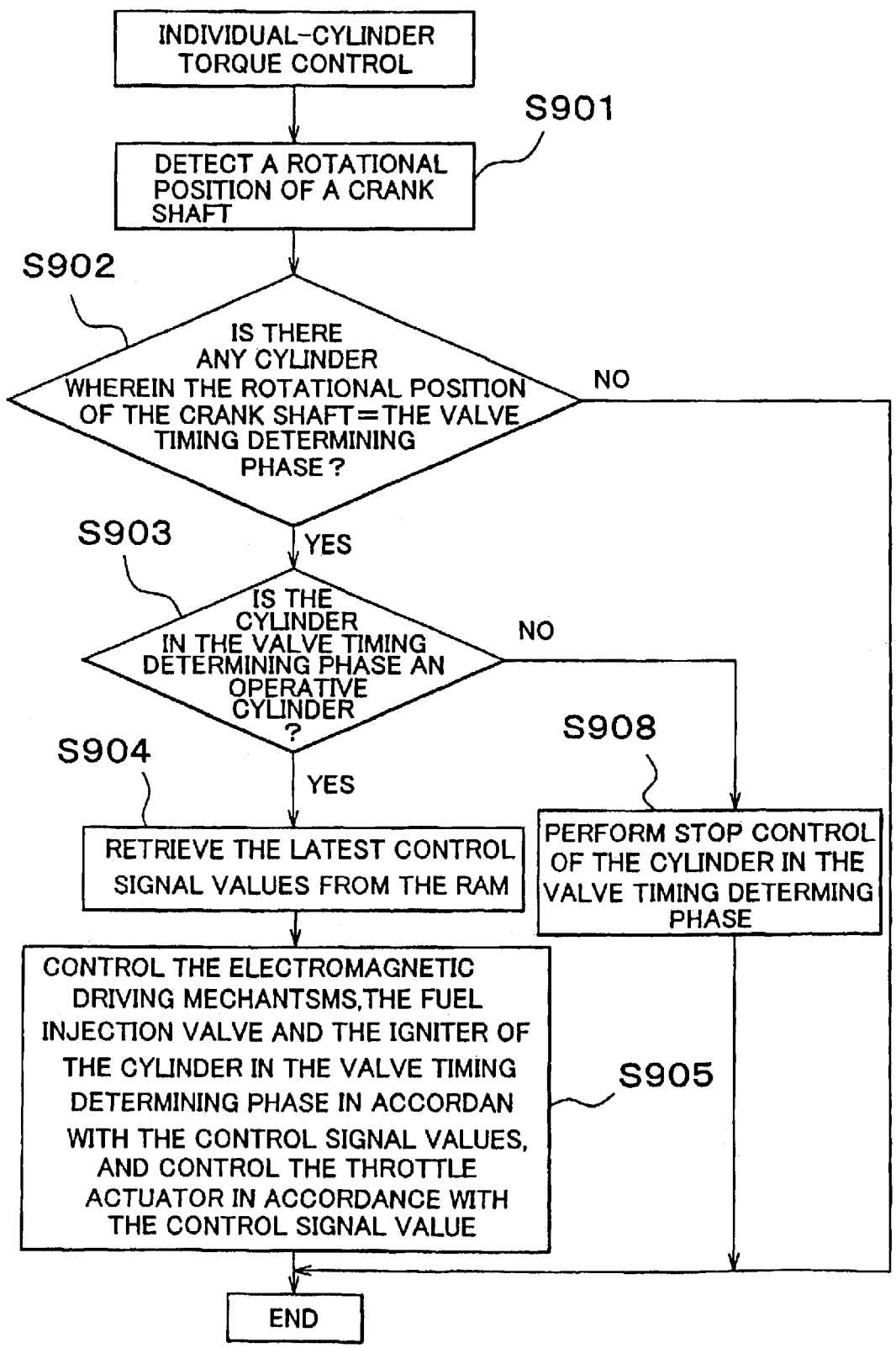

METHOD AND APPARATUS FOR CONTROLLING THE CYLINDER TORQUE OF A COMBUSTION ENGINE

This is a Division of application Ser. No. 09/810,622 filed Mar. 19, 2001 now U.S. Pat. No. 6,546,910. The entire disclosure of the prior application(s) is hereby incorporated by reference herein in its entirety.

INCORPORATION BY REFERENCE

The disclosure of Japanese Patent Application No. 2000-078954 filed on Mar. 21, 2000 including the specification, drawings and abstract is incorporated herein by reference in its entirety.

BACKGROUND OF THE INVENTION

1. Field of Invention

The invention relates to controlling the torque of an internal combustion engine installed in a vehicle or the like and, more particularly, to controlling the torque of an internal combustion engine having valve mechanisms for driving opening and closing intake and exhaust valves in their opening and closing directions by an electromagnetic force.

2. Description of Related Art

In recent years, mainly for the purpose of preventing a mechanical loss resulting from the driving of intake and exhaust valves in their opening and closing directions, preventing a pumping loss of intake air, and enhancing the net thermal efficiency in an internal combustion engine installed in a vehicle or the like, the development of a valve mechanism capable of arbitrarily changing timings for opening and closing intake and exhaust valves has been promoted.

Electromagnetic driving valve mechanisms are known. Some of these mechanisms have an armature made of a magnetic material that reciprocate in an interlocking relationship with intake and exhaust valves, a closing electromagnet attracting the armature in its closing direction upon application of an exciting current, an opening electromagnet attracting the armature in its opening direction upon application of an exciting current, a closing-side return spring urging the armature in its closing direction, and an opening-side return spring urging the armature in its opening direction.

According to such an electromagnetic driven valve mechanism, there is no need to drive intake and exhaust valves in their opening and closing directions by the turning force of an engine output shaft (crank shaft) as is the case with a conventional valve mechanism. Therefore, the loss of the engine output resulting from the driving of the intake and exhaust valves is prevented.

Furthermore, according to an electromagnetic driving unit as mentioned above, there is no need to drive intake and exhaust valves in their opening and closing directions in an interlocking relationship with the rotation of an engine output shaft as is the case with a conventional valve mechanism, and the intake and exhaust valves can be opened and closed at arbitrary timings by changing the timings when an exciting current is applied to an opening electromagnet and a closing electromagnet. Therefore, it is possible to control the amount of intake air in each cylinder without employing an intake throttle valve (throttle valve). As a result, the possibility of the pumping loss of intake air resulting from the throttle valve is eliminated.

On the other hand, in an electromagnetic driving valve mechanism as mentioned above, it is also important to precisely control the combustion pressure generated during combustion of a mixture in each cylinder, namely, the torque generated in each cylinder in accordance with the operation state of an internal combustion engine, the running condition of a vehicle and the like.

In order to meet such demands, Japanese Patent Application Laid-Open No. 10-37727 proposes a device for controlling intake and exhaust valves in a multi-cylinder engine. The device, electromagnetically operating intake and exhaust valves, disposed in each cylinder of an internal combustion engine, are automatically controlled to be opened and closed in accordance with an operation state of the engine. The device is designed to ensure the leveling of the torques generated in all the cylinders by correcting the timings for the opening and the closing of the intake or exhaust valves such that an equal amount of intake air is sucked into each cylinder.

In a device for controlling intake and exhaust valves in a multi-cylinder engine as mentioned above, the torque of the internal combustion engine is controlled as a whole while ensuring the leveling of the torques in all the cylinders. Thus, in the case where the torque of the internal combustion engine is increased or reduced as a whole, the torques in all the cylinders are increased or reduced en bloc. Because the amount of an increase or a decrease in the torques tends to be great, an acceleration-deceleration shock may be caused.

Further, torque control of the internal combustion engine is not linked with gear-change operation of a transmission in the vehicle, and an acceleration-deceleration shock may be caused by gear-change of the transmission.

SUMMARY OF THE INVENTION

It is an object of the invention to provide a method and an apparatus to realize high-precision torque control adapted for an operation state of an internal combustion engine and/or a running condition of a vehicle by providing individual control of the torques in cylinders of an internal combustion engine having valve mechanisms that drive intake and exhaust valves in their opening and closing directions by an electromagnetic force.

It is another object of the invention to provide a method and an apparatus to realize high-precision torque control in an internal combustion engine having valve mechanisms that drive intake and/or exhaust valves in their opening and closing directions by an electromagnetic force by performing torque control of the internal combustion engine in accordance with an operation state of a transmission.

An internal combustion engine having valves according to a first aspect of the invention comprises electromagnetic driving valve mechanisms that drive the intake and exhaust valves of the internal combustion engine in their opening and closing directions by means of an electromagnetic force, a target cylinder torque calculator that calculates a target cylinder torque required of one cylinder in accordance with a target engine torque required of the internal combustion engine, a valve timing determiner that determines timings for the opening and the closing of the intake and/or exhaust valves in accordance with the target cylinder torque calculated by the target cylinder torque calculator, and a valve controller that controls the electromagnetic driving valve mechanisms in accordance with the timings determined by the valve timing determiner.

In an internal combustion engine having valves thus constructed, if a target engine torque is determined with the operation state of the internal combustion engine, the running condition of a vehicle equipped with the internal combustion engine and the like being used as parameters, a target cylinder torque required of one cylinder is calculated based on the target engine torque, and the timings for the opening and the closing of the intake and/or exhaust valves are determined in accordance with the target cylinder torque.

In this case, the intake and/or exhaust valves in each cylinder are driven in their opening and closing directions at the timings determined based on the target cylinder torque required of one cylinder, and each cylinder generates a torque corresponding to the target cylinder torque. In other words, the torque of the internal combustion engine is controlled based on the individual control of the torques in the cylinders.

As a result, the torque of the internal combustion engine is finely controlled. For example, in the case where the torque of the internal combustion engine is increased or reduced, it is also possible to increase or reduce the torque of the internal combustion engine linearly by gradually increasing or reducing the torques in the respective cylinders according to the combustion sequence (ignition sequence).

The target cylinder torque calculator may individually calculate target cylinder torques for all of the cylinders of the internal combustion engine. In this case, the valve timing determiner individually determines the timings for the opening and the closing of the intake and/or exhaust valves of all the cylinders in accordance with the target cylinder torques individually calculated by the target cylinder torque calculator.

The target torque of the internal combustion engine is obtained by correcting a base target torque that is determined using the engine load, the speed of the internal combustion engine and the like as parameters, in consideration of various correction factors.

For example, the aforementioned correction factors include an acceleration-deceleration shock absorbing torque for absorbing an acceleration-deceleration shock generated in conjunction with gear-change operation of an automatic transmission (A/T), an acceleration-deceleration shock absorbing torque for absorbing an acceleration-deceleration shock that is generated when an auxiliary operated by part of the output of the internal combustion engine, such as a compressor for an air-conditioner is switched between its operative state and its inoperative state, an acceleration-deceleration shock absorbing torque for absorbing an acceleration-deceleration shock generated based on the magnitude of moment of inertia of a continuously variable transmission (CVT), and a deceleration shock absorbing torque for absorbing a shock generated in conjunction with deceleration control that is performed when the running speed of a vehicle equipped with the internal combustion engine reaches a predetermined upper limit value.

In the aforementioned aspect, a fuel injection controller for determining a fuel injection amount and/or a fuel injection timing for each of the cylinders in accordance with the target cylinder torque calculated by the target cylinder torque calculator can be provided. If the timings for the opening and the closing the intake and/or exhaust valves in each of the cylinders are determined in accordance with the target cylinder torque, the amounts of intake air in the respective cylinders may be different from one another. Therefore, in such a case, the amount of fuel injection needs to suit the amount of intake air in each of the cylinders.

In the aforementioned aspect, an intake throttle valve can be disposed in an intake passage of the internal combustion engine to adjust an amount of air flowing through the intake passage and a valve opening degree determiner can be provided for determining an opening degree of the intake throttle valve in accordance with the target cylinder torque calculated by the target cylinder torque calculator.

In this case, it becomes possible to use the valve mechanisms in combination with the intake throttle valve to control the amount of intake air in the internal combustion engine, namely, the load applied to the internal combustion engine, and guarantee a precise amount of intake air that is required of each cylinder to achieve the target cylinder torque.

In addition to the aforementioned components, that is, the valve mechanisms, the target cylinder torque calculator, the valve timing determiner and the valve controller, the internal combustion engine according to the invention may further comprise an intake manifold negative pressure detector for detecting an intake manifold negative pressure generated in an intake passage of the internal combustion engine.

In this case, the valve timing determiner determines timings for the opening and closing the intake and/or exhaust valves based on the target cylinder torque calculated by the target cylinder torque calculator and the intake manifold negative pressure detected by the intake manifold negative pressure detector. This is because the torque of the internal combustion engine is controlled while supplying a predetermined intake manifold negative pressure to a system operating based on the intake manifold negative pressure, such as a brake booster constituting a braking system of the vehicle, an exhaust gas recirculation system (EGR system) for returning part of the exhaust gas in the internal combustion engine to the intake system, and the like.

An internal combustion engine according to a second aspect of the invention comprises valve mechanisms that drive at least one of intake and exhaust valves of the internal combustion engine in their opening and closing directions by means of an electromagnetic force, a transmission capable of changing a gear change ratio, and a controller that controls one of the valve mechanism and the transmission in accordance with the an operation state of the other valve mechanism and the transmission.

According to the above-mentioned second aspect, one of the e valve mechanism and the transmission is controlled in accordance with an operation state of the other of the valve mechanism and the transmission. Therefore, it is possible to further improve the driveability.

The controller may control the valve mechanism, and may control opening characteristics of at least one of the intake and exhaust valves in accordance with an operation state of the transmission. According to this aspect, it is possible to absorb an acceleration-deceleration shock resulting from gear-change operation of the transmission, and further improve the driveability.

BRIEF DESCRIPTION OF THE DRAWINGS

The invention will be described in conjunction with the following drawings in which like reference numerals designate like elements and wherein:

FIG. 9 is a flowchart showing an individual-cylinder torque control process according to another embodiment of this invention.

DETAILED DESCRIPTION OF PREFERRED EMBODIMENTS

Hereinafter, concrete embodiments of an internal combustion engine according to the invention will be described with reference to the drawings.

Figure 1:
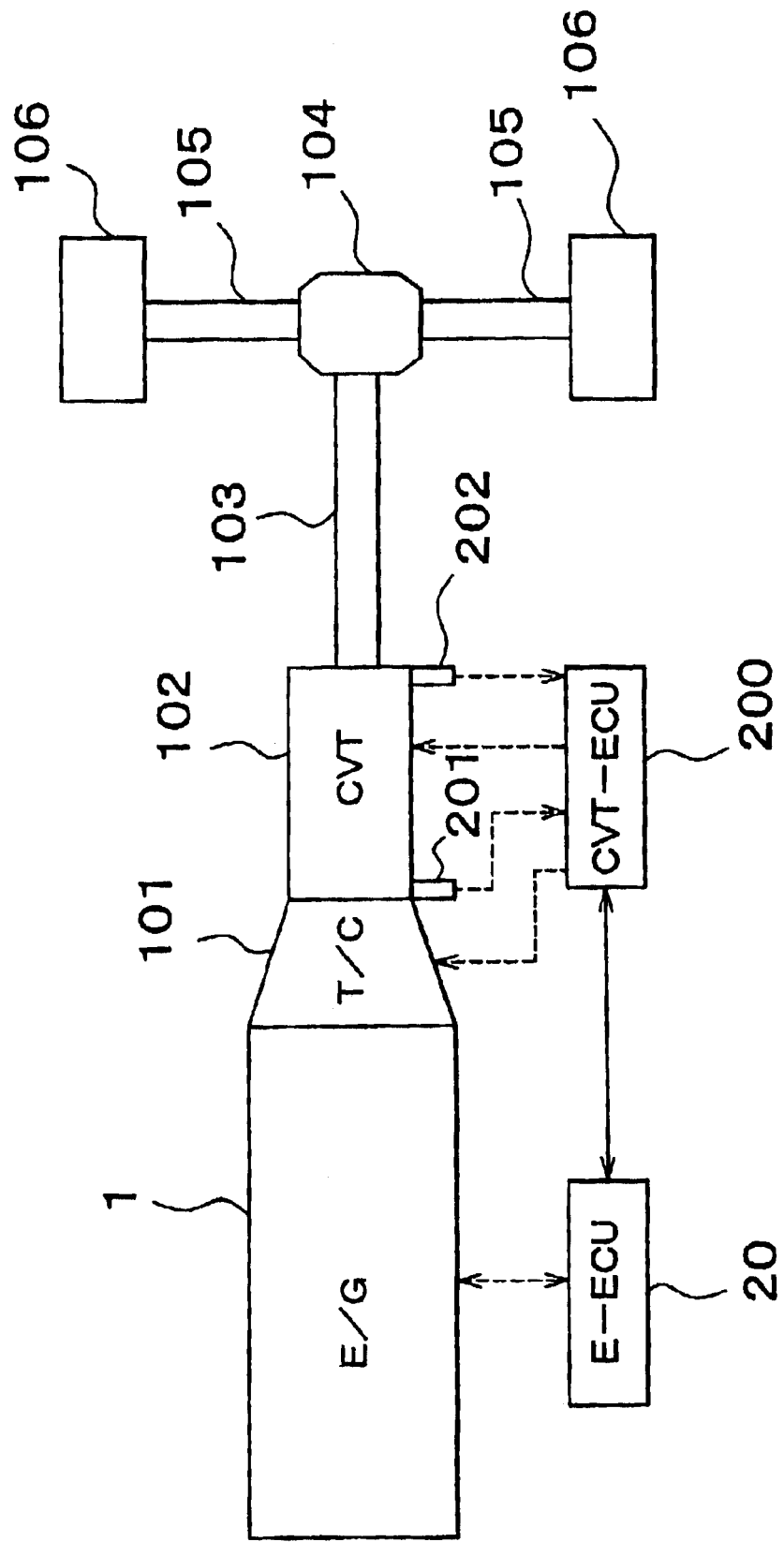
FIG. 1 schematically shows the structure of a power train system of a vehicle equipped with an internal combustion engine according to one exemplary embodiment of this invention.

FIG. 1 schematically shows the structure of a power train of a vehicle equipped with an internal combustion engine according to this invention.

Referring to FIG. 1, the power train of the vehicle has an internal combustion engine (E/G) 1, a torque converter (T/C) 101, a continuously variable transmission (CVT) 102, a propeller shaft 103, and a differential gear 104. The internal combustion engine (E/G) 1 serves as a drive source of the vehicle. The torque converter (T/C) 101 is connected to an engine output shaft (crank shaft) of the internal combustion engine (E/G) 1 and amplifies the rotational torque of the crank shaft. The continuously variable transmission (CVT) 102 is connected to an output shaft of the torque converter (T/C) 101 and continuously and non-stepwise changes the rotational speed of the output shaft. The propeller shaft 103 is connected to an output shaft of the continuously variable transmission (CVT) 102. The differential gear 104 is connected to the propeller shaft 103 and transmits the rotational torque of the propeller shaft 103 to driven wheels 106 through a drive shaft 105.

It is possible to exemplify a belt-type continuously variable transmission (CVT) as the continuously variable transmission (CVT) 102. The belt-type continuously variable transmission has two variable pulleys each of which is composed of a movable rotating body that is movable in the direction of its rotational shaft and a stationary rotating body, a belt coupling the two variable pulleys, and an actuator displacing the movable rotational bodies of the variable pulleys by hydraulic pressures to change the groove widths of the variable pulleys and thus change the hanging diameter of the belt. A rotational shaft of one of the variable pulleys is coupled to the output shaft of the torque converter (T/C) 101, and a rotational shaft of the other variable pulley is coupled to the propeller shaft 103.

In the belt-type continuously variable transmission (CVT) as mentioned above, the actuator (not shown) changes the groove widths of the variable pulleys (i.e. the hanging diameter of the belt) while maintaining the tension of the belt constant, and thereby can continuously change the gear ratio of the propeller shaft 103 to the output shaft of the torque converter (T/C) 101.

It is also possible to exemplify a toroidal-type continuously variable transmission (CVT) 102 as the continuously variable transmission (CVT) 102. The toroidal-type continuously variable transmission has a power roller interposed between a pair of discs having toroidal faces and tilts the power roller to change the contacting diameter determined by the power roller and the discs and thus change the gear ratio between the discs.

The continuously variable transmission (CVT) 102 has an input-side rotational speed sensor 201 outputting an electric signal corresponding to the rotational speed of an input shaft of the continuously variable transmission (CVT) 102 and an output-side rotational speed sensor 202 outputting an electric signal corresponding to the rotational speed of the output shaft of the continuously variable transmission (CVT) 102.

Figure 2:
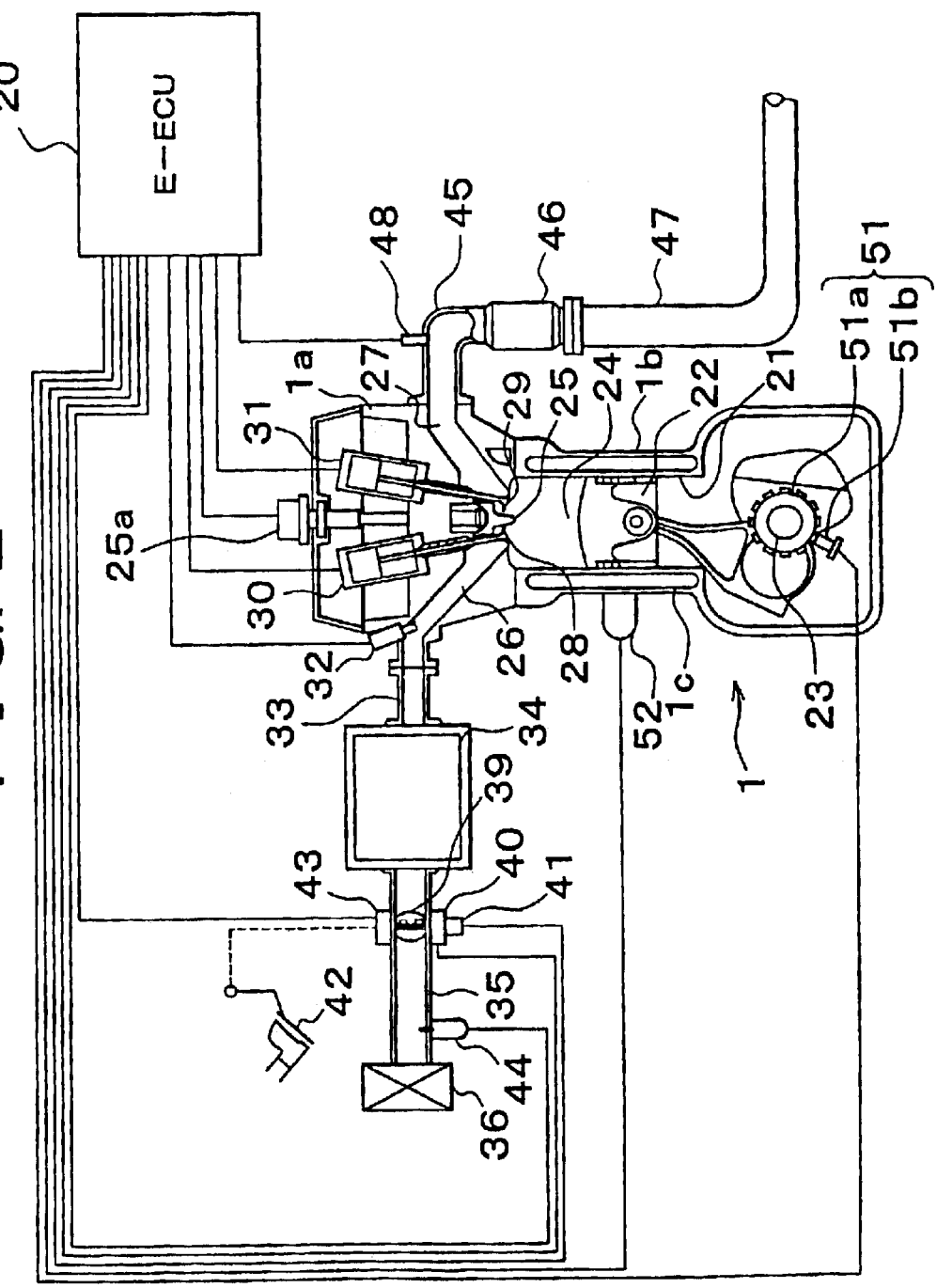
FIG. 2 shows the structure of an internal combustion engine (E/G)

The internal combustion engine (E/G) 1 is a gasoline engine having a plurality of cylinders 21, as shown in FIG. 2. The internal combustion engine (E/G) 1 has a cylinder block 1b in which the cylinders 21 and a coolant passage 1c are formed and a cylinder head 1a that is fixed to an upper part of the cylinder block 1b.

A crank shaft 23 serving as an engine output shaft is rotatably supported by the cylinder block 1b. The crank shaft 23 is coupled to pistons 22, which are slidably fitted into the respective cylinders 21.

Disposed above each of the pistons 22 for each of the cylinders 21 is a combustion chamber 24 surrounded by a top face of the piston 22 and a wall surface of the cylinder head 1a. An ignition plug 25 is mounted to the cylinder head 1a so as to face the combustion chamber 24. An igniter 25a is connected to the ignition plug 25 to apply a driving current to the ignition plug 25.

Two intake ports 26 and two exhaust ports 27 are formed in the cylinder head 1a such that the open ends of the intake ports 26 and the exhaust ports 27 face the combustion chamber 24. A fuel injection valve 32 is mounted to the cylinder head 1a such that an injection hole of the injection valve 32 faces the intake ports 26.

A plurality of intake valves 28 are reciprocally disposed in the cylinder head 1a. The intake valves 28 open and close the open ends of the intake ports 26. Mounted to each of the intake valves 28 is a valve mechanism 30 (hereinafter referred to as the intake-side valve mechanism 30). The intake-side valve mechanism 30 reciprocally drives the intake valves 28 by an electromagnetic force generated upon application of an exciting current.

Exhaust valves 29 are reciprocally disposed in the cylinder head 1a. The exhaust valves 29 open and close the open ends of the exhaust ports 27 Mounted to each of the exhaust valves 29 is a valve mechanism (hereinafter referred to as the exhaust-side valve mechanism 31). The exhaust-side valve mechanism reciprocally drives the exhaust valves 29 by an electromagnetic force generated upon application of an exciting current.

Concrete structures of the intake-side valve mechanism 30 and the exhaust-side valve mechanism 31 will now be described. Because the intake-side valve mechanism 30 and the exhaust-side valve mechanism 31 are structurally similar, the following description will refer to only the intake-side valve mechanism 30, but is also applicable to the exhaust-side valve mechanism 31.

Figure 3:
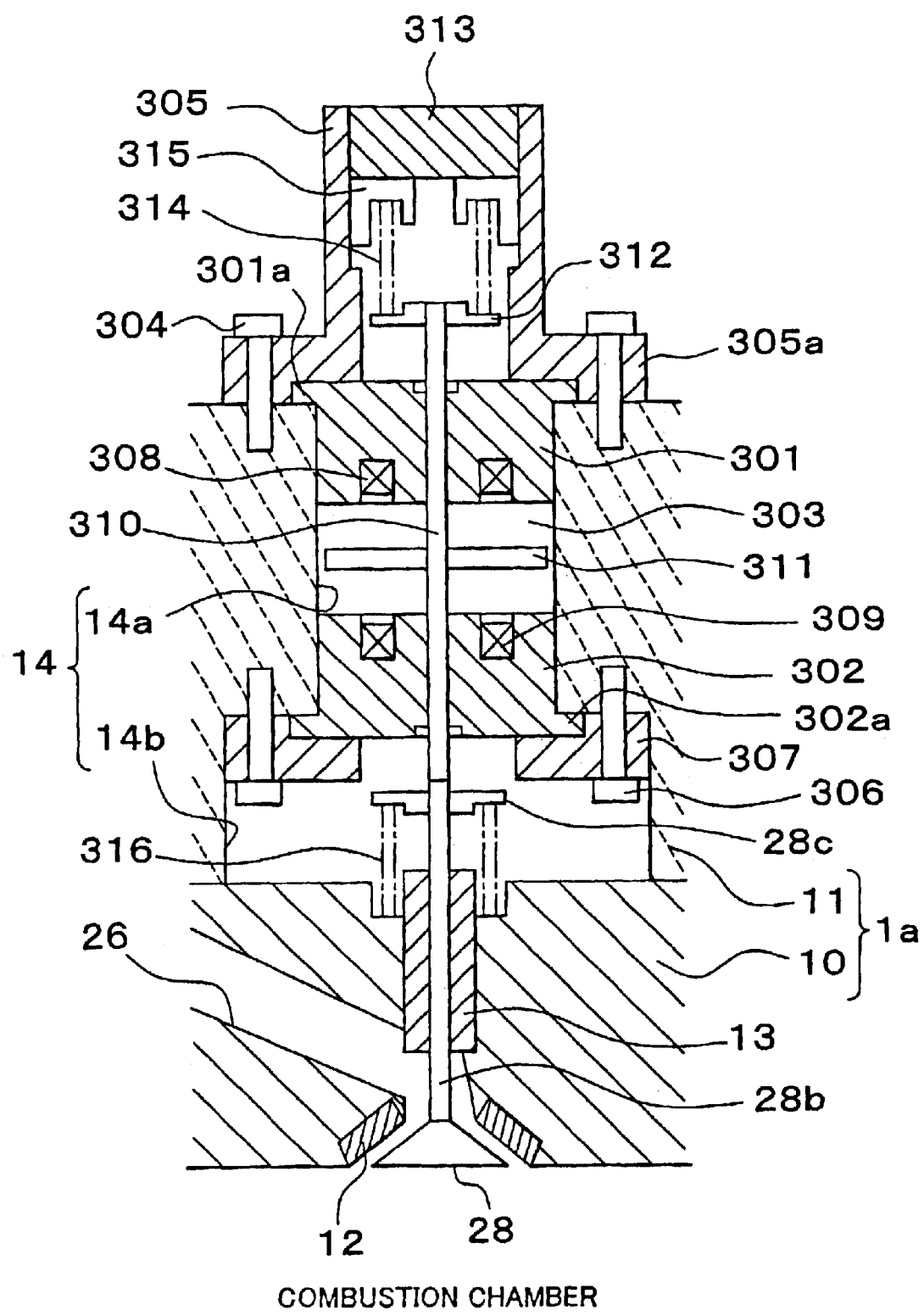
FIG. 3 shows the structure of an intake-side valve mechanism, according to one exemplary embodiment of this invention.

FIG. 3 is a cross-sectional view of the structure of the intake-side valve mechanism 30. Referring to FIG. 3, the cylinder head 1a of the internal combustion engine (E/G) 1 has a lower head 10 fixed to the upper face of the cylinder block 1b (not shown in FIG. 3) and an upper head 11 disposed on the lower head 10.

The intake ports 26 corresponding to the respective cylinders 21 are formed in the lower head 10. Disposed at the open end of each of the intake ports 26 on the side of the combustion chamber 24 is a valve seat 12 on which a valve body 28a of the intake valve 28 seats.

A through hole having a circular cross-section is formed in the lower head 10. This through hole extends from the inner wall surface of each of the intake ports 26 to the upper face of the lower head 10. Inserted into the through hole is a tubular valve guide 13. The valve guide 13 reciprocally holds a valve shaft 28b of the intake valve 28 that inserted into the through hole.

The upper head 11 has a core mounting hole 14 which has a circular cross-section and into which a first core 301 and a second core 302 are fitted. The core mounting hole 14 is concentrically located with the valve guide 13. The core mounting hole 14 has a lower portion that is radially enlarged. In other words, the core mounting hole 14 has an upper small-diameter portion 14a and a lower large-diameter portion 14b.

The first core 301 and the second core 302 are annular and made of a soft magnetic material. The first core 301 and the second core 302 are axially fitted in series with a predetermined gap 303 in the upper small-diameter portion 14a. A flange 301a and a flange 302a are formed at the upper end of the first core 301 and the lower end of the second core 302 respectively. The first core 301 and the second core 302 are fitted into the core mounting hole 14 from above and below the core mounting hole 14, respectively. The flange 301a and the flange 302a abut on the edges of the core mounting hole 14. Thereby the first core 301 and the second core 302 are positioned, and the gap 303 is maintained at a predetermined distance.

A tubular upper cap 305 is disposed on the first core 301. Bolts 304 penetrate a flange 305a formed at the lower end of the upper cap 305, and the upper cap 305 is fixed to the upper face of the upper head 11. In this exemplary embodiment, the lower end of the upper cap 305 including the flange 305a securely abuts on the upper peripheral edge of the first core 301, so that the first core 301 is fixed to the upper head 11.

A lower cap 307 is disposed on the second core 302. The lower cap 307 is constructed of an annular body whose outer diameter is approximately equal to the diameter of the large-diameter portion 14b of the core mounting hole 14. Bolts 306 penetrate the lower cap 307. The lower cap 307 is fixed to a lower face of the second core 302 in a stepped section between the small-diameter portion 14a and the large-diameter portion 14b by means of the bolts 306. In this exemplary embodiment, the lower cap 307 securely abuts on the lower peripheral edge of the second core 302. As a result, the second core 302 is fixed to the upper head 11.

A first electromagnetic coil 308 is held in a groove formed in the first core 301 on the side of the first core 301 that faces the gap 303. A second electromagnetic coil 309 is held in a groove formed in the second core 302 on the side of the second core 302 that faces the gap 303. The first electromagnetic coil 308 and the second electromagnetic coil 309 are disposed so as to face each other with the gap 303 formed therebetween.

An armature 311 is disposed in the gap 303. The armature 311 is made of an annular soft magnetic material. The armature 311 has an outer diameter that is smaller than the inner diameter of the gap 303. A cylindrical armature shaft 310 extends in a vertical direction along the axis of the armature 311. The armature shaft 310 is secured in a hollow portion of the armature 311. The armature shaft 310 has an upper end and a lower end. The upper end extends to the inside of the upper cap 305 through a hollow portion of the first core 301. The lower end extends to the inside of the large-diameter portion 14b through a hollow portion of the second core 302. The first core 301 and the second core 302 hold the armature shaft 310 such that the armature shaft 310 can reciprocate in the axial direction.

An upper retainer 312 in the shape of a circular disc is bonded to the upper end of the armature shaft 310. An adjusting bolt 313 is screwed into an upper opening of the upper cap 305. An upper spring 314 is interposed between the upper retainer 312 and the adjusting bolt 313. A spring seat 315 is interposed between the adjusting bolt 313 and the upper spring 314 as an abutment face therebetween. The spring seat 315 has an outer diameter that is approximately equal to the inner diameter of the upper cap 305.

The upper end of the valve shaft 28b of the intake valve 28 abuts on the lower end of the armature shaft 310. A lower retainer 28c is bonded to the outer periphery of the upper end of the valve shaft 28b. The lower retainer 28c has the shape of a circular disc. A lower spring 316 is interposed between the lower face of the lower retainer 28c and the upper face of the lower head 10.

When no exciting current is being applied to the first electromagnetic coil 308 and the second electromagnetic coil 309, a downwardly urging force is applied from the upper spring 314 to the armature shaft 310 (i.e. in the direction for opening the intake valve 28), and an upwardly urging force is applied from the lower spring 316 to the intake valve 28 (i.e. in the direction for closing the intake valve 28). As a result, the armature shaft 310 and the intake valve 28 abut on each other and are elastically supported at a predetermined position. Namely, the armature shaft 310 and the intake valve 28 are held in their neutral state.

The urging forces of the upper spring 314 and the lower spring 316 are set such that the neutral position of the armature 311 coincides with an intermediate position between the first core 301 and the second core 302 in the gap 303. If the neutral position of the armature 311 has deviated from the intermediate position due to the initial tolerance among components or their time-dependant changes, it is possible to make an adjustment using the adjusting bolt 313 such that the neutral position of the armature 311 coincides with the intermediate position.

The axial lengths of the armature shaft 310 and the valve shaft 28b are set such that the valve body 28a assumes an intermediate position between its fully-open-side displacement end and its fully-closed-side displacement end (hereinafter referred to as the intermediate position) when the armature 311 is located at the intermediate position in the gap 303.

In the intake-side valve mechanism 30, an electromagnetic force for displacing the armature 311 towards the first core 301 is generated among the first core 301, the first electromagnetic coil 308 and the armature 311 upon application of an exciting current to the first electromagnetic coil 308. An electromagnetic force for displacing the armature 311 towards the second core 302 is generated among the second core 302, the second electromagnetic coil 309 and the armature 311 upon application of an exciting current to the second electromagnetic coil 309.

Accordingly, in the intake-side valve mechanism 30, the armature 311 reciprocates by alternately applying an exciting current to the first electromagnetic coil 308 and the second electromagnetic coil 309, and hence the valve body 28a is driven in its opening and closing directions. By changing the timings of application and the magnitude of an exciting current applied to the first electromagnetic coil 308 and the second electromagnetic coil 309, it is possible to control the timings for opening and closing the intake valve 28.

Referring again to FIG. 2, the intake ports 26 of the internal combustion engine (E/G) 1 are in communication with respective branches of an intake manifold 33 that is mounted to the cylinder head 1a of the internal combustion engine (E/G) 1. The intake manifold 33 is connected to a surge tank 34 for damping the pulsation of intake air. An intake pipe 35 is connected to the surge tank 34. The intake pipe 35 is connected to an air cleaner box 36 for removing dust and dirt from intake air.

An air flow meter 44 outputting an electric signal corresponding to the amount of air flowing through the intake pipe 35 (intake air mass) is mounted to the intake pipe 35. A throttle valve 39 for adjusting the amount of the intake air flowing through the intake pipe 35 is disposed in a portion downstream of the air flow meter 44 in the intake pipe 35. The throttle valve 39 is one example of an intake throttle valve according to the invention.

A throttle actuator 40, a throttle position sensor 41 and an accelerator position sensor 43 are mounted to the throttle valve 39. The throttle actuator 40 is constructed of a stepper motor or the like and drives the throttle valve 39 in its opening and closing directions in accordance with an applied voltage. The throttle position sensor 41 outputs an electric signal corresponding to the degree of operating of the throttle valve 39. The accelerator position sensor 43 is mechanically connected to an accelerator pedal 42 and outputs an electric signal corresponding to the operation amount of the accelerator pedal 42.

The exhaust ports 27 of the internal combustion engine (E/G) 1 are in communication with respective branches of an exhaust manifold 45 that is mounted to the cylinder head 1a. The exhaust manifold 45 is connected to an exhaust pipe 47 through an exhaust gas purification catalyst 46. The exhaust pipe 47 is connected downstream thereof to a muffler (not shown).

An air-fuel ratio sensor 48 outputting an electric signal corresponding to the air-fuel ratio of the exhaust gas flowing through the exhaust manifold 45, namely, the air-fuel ratio of the exhaust gas flowing into the exhaust gas purification catalyst 46 is mounted to the exhaust manifold 45.

The exhaust gas purification catalyst 46 is designed as a three-way catalyst, an occlusion-reduction-type catalyst, a selective-reduction-type NOX catalyst or a suitable combination thereof. The three-way catalyst purifies hydrocarbon (HC), carbon monoxide (CO) and nitrogen oxides (NOX) contained in exhaust gas when the exhaust gas flowing into the exhaust gas purification catalyst 46 has a predetermined air-fuel ratio close to a stoichiometric air-fuel ratio. The occlusion-reduction type catalyst occludes nitrogen oxides (NOX) contained in exhaust gas when the exhaust gas flowing into the exhaust gas purification catalyst 46 has a lean air-fuel ratio, and discharges the occluded nitrogen oxides (NOX) and reduces and purifies them when the exhaust gas flowing into the exhaust gas purification catalyst 46 has a stoichiometric or rich air-fuel ratio. The selective-reduction-type NOX catalyst reduces and purifies nitrogen oxides (NOX) contained in exhaust gas when the exhaust gas flowing into the exhaust gas purification catalyst 46 has an air-fuel ratio indicating a state of excessive oxygen and a predetermined reducing agent exists.

The internal combustion engine (E/G) 1 is provided with a crank position sensor 51 and a coolant temperature sensor 52. The crank position sensor 51 includes of a timing rotor 51a mounted to an end of the crank shaft 23 and an electromagnetic pick-up sensor 51b mounted to a cylinder block 1b in the proximity of the timing rotor 51a. The coolant temperature sensor 52 is mounted to the cylinder block 1b to detect the temperature of the coolant flowing through a coolant passage 1c.

Referring again to FIG. 1, a main controller, which is composed of an electronic control unit/first controller 200 (hereinafter referred to as the CVT-ECU) for controlling the continuously variable transmission (CVT) 102 and the torque converter (T/C) 101 and an electronic control unit (hereinafter referred to as the E-ECU) for controlling the internal combustion engine (E/G) 1 and the like, is disposed in combination with the power train constructed as described above.

Various sensors such as an input-side rotational speed sensor 201 and an output-side rotational speed sensor 202 are connected to the CVT-ECU 200 through electric wires. A gear-change actuator (not shown) built into the continuously variable transmission (CVT) 102 and a lock-up actuator (not shown) built into the torque converter (T/C) 101 to switch engagement and disengagement of a lock-up clutch, and the like are connected to the CVT-ECU 200 through electric wires. Using output signals from the sensors as parameters, the CVT-ECU 200 can perform gear-change control of the continuously variable transmission (CVT) 102 and switching control for switching engagement and disengagement of the lock-up clutch of the torque converter (T/C) 101.

Various sensors such as the throttle position sensor 41, the accelerator position sensor 43, the air flow meter 44, the air-fuel ratio sensor 48, the crank position sensor 51 and the coolant temperature sensor 52 are connected to the E-ECU 20 through electric wires, FIG. 2. Output signals from these sensors are inputted to the E-ECU 20.

Furthermore, the igniter 25a, the intake-side valve mechanism 30, the exhaust-side valve mechanism 31, the fuel injection valve 32, the throttle actuator 40 and the like are connected to the E-ECU 20 through electric wires. Using output signals from these sensors as parameters, the E-ECU 20 can control the igniter 25a, the intake-side valve mechanism 30, the exhaust-side valve mechanism 31, the fuel injection valve 32, the throttle actuator 40 and the like.

The CVT-ECU 200 and the E-ECU 20 are connected through a communication line and exchange signals with each other, whereby it is possible to perform cooperative control of the internal combustion engine (E/G) 1 and the continuously variable transmission (CVT) 102.

In performing cooperative control of the CVT-ECU 200 and the E-ECU 20, the E-ECU 20 calculates a driving force required of the vehicle (i.e., a target vehicle driving force) using an output signal value of the accelerator position sensor 43 (an accelerator opening degree) and a running speed of the vehicle (a vehicle speed) converted from an output signal value of the output-side rotational speed sensor 202 as parameters.

In addition to the target vehicle driving force and the vehicle speed, the E-ECU 20 calculates an output required of the internal combustion engine (E/G) 1 (a target engine output) using the operating conditions of auxiliary components that are operated by part of the output of the internal combustion engine (E/G) 1, such as an air-conditioner compressor as parameters.

In an attempt to accomplish the target engine output, the E-ECU 20 determines a target engine speed and a target engine torque so as to minimize the concentration of exhaust emission substances and the amount of fuel consumption. The E-ECU 20 sends the target engine speed to the CVT-ECU 200.

Upon receiving the target engine speed from the E-ECU 20, the CVT-ECU 200 determines a gear-change schedule of the continuously variable transmission (CVT) 102 using the target engine speed and the vehicle speed as parameters.

The E-ECU 20 adds an inertia torque of the internal combustion engine (E/G) 1 (engine inertia torque), a CVT inertia torque, acceleration-deceleration shock absorbing torques, and a deceleration shock absorbing torque to the target engine torque, to determine a torque schedule for a predetermined period (e.g. while the crank shaft 23 rotates by 720° C.A). The inertia torque is determined in accordance with the engine speed of the internal combustion engine (E/G) 1. The CVT inertia torque is determined in accordance with the rotational speed of the input shaft of the CVT 102 inputted into the CVT-ECU 200. One of the acceleration-deceleration shock absorbing torques is intended to absorb an acceleration-deceleration shock resulting from the operation of switching engagement and disengagement of the lock-up clutch of the torque converter (TIC) 101 or the gear-change operation of the CVT-ECU 200. The other acceleration-deceleration shock absorbing torque is intended to absorb an acceleration-deceleration shock resulting from a demand for acceleration or deceleration from a traction control unit (not shown), an ABS control unit (not shown) and the like. The deceleration shock absorbing torque is intended to absorb a deceleration shock resulting from a demand for deceleration that is made when the vehicle speed reaches a predetermined upper limit value.

The aforementioned various acceleration-deceleration shock absorbing torques are experimentally calculated in advance, and may be stored as a map in a read-only-memory (ROM) of the E-ECU 20 or a ROM of the CVT-ECU 200.

If the gear-change schedule and the torque schedule are determined in this manner, the CVT-ECU 200 performs gear-change control of the continuously variable transmission (CVT) 102 based on the gear-change schedule, and performs individual-cylinder torque control based on the torque schedule. This torque control constitutes the essence of this exemplary embodiment.

Hereinafter, individual-cylinder torque control according to this exemplary embodiment is described.

Figure 4:
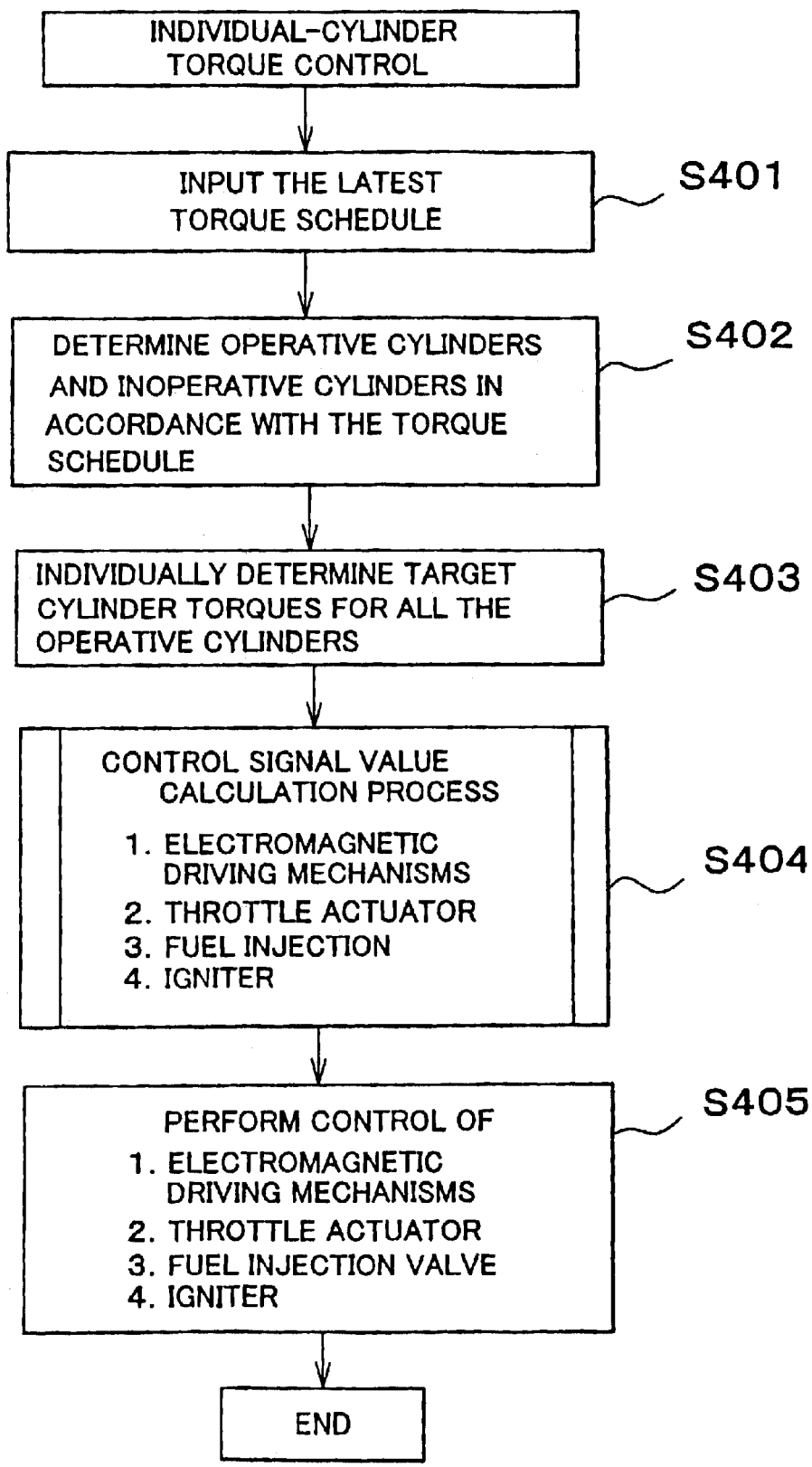
FIG. 4 is a flowchart showing an individual-cylinder torque control process, according to one exemplary embodiment of this invention.

In performing individual-cylinder torque control, the E-ECU 20 executes a torque control process as shown in FIG. 4. This individual-cylinder torque control process is stored in advance in the ROM of the E-ECU 20 and repeatedly executed at intervals of a predetermined period (e.g. every time the crank shaft 23 rotates by 720° C.A).

In S401, the latest torque schedule is received by the E-ECU 20.

In the individual-cylinder torque control process, the E-ECU 20 determines in S402 the cylinders 21 that are to be in operation (the operative cylinders 21) and the cylinders 21 to be out of operation (the inoperative cylinders 21) based on the latest torque schedule.

In S403, the E-ECU 20 determines a target cylinder torque required of the operative cylinders 21 individually.

For example, if the torque schedule is determined so as to increase the torque of the internal combustion engine (E/G) 1, the E-ECU 20 determines a target cylinder torque of the operative cylinders 21 individually such that the torques of the respective operative cylinders 21 gradually increase in accordance with the ignition sequence.

If the torque schedule is determined so as to reduce the torque of the internal combustion engine (E/G) 1, the E-ECU 20 determines a target cylinder torque of the operative cylinders 21 individually such that the torques of the respective operative cylinders 21 gradually decrease in accordance with the ignition sequence.

In S404, the E-ECU 20 determines control signal values for the intake-side valve mechanism 30, the exhaust-side valve mechanism 31, the fuel injection valve 32, the igniter 25a and the throttle actuator 40.

Figure 5:
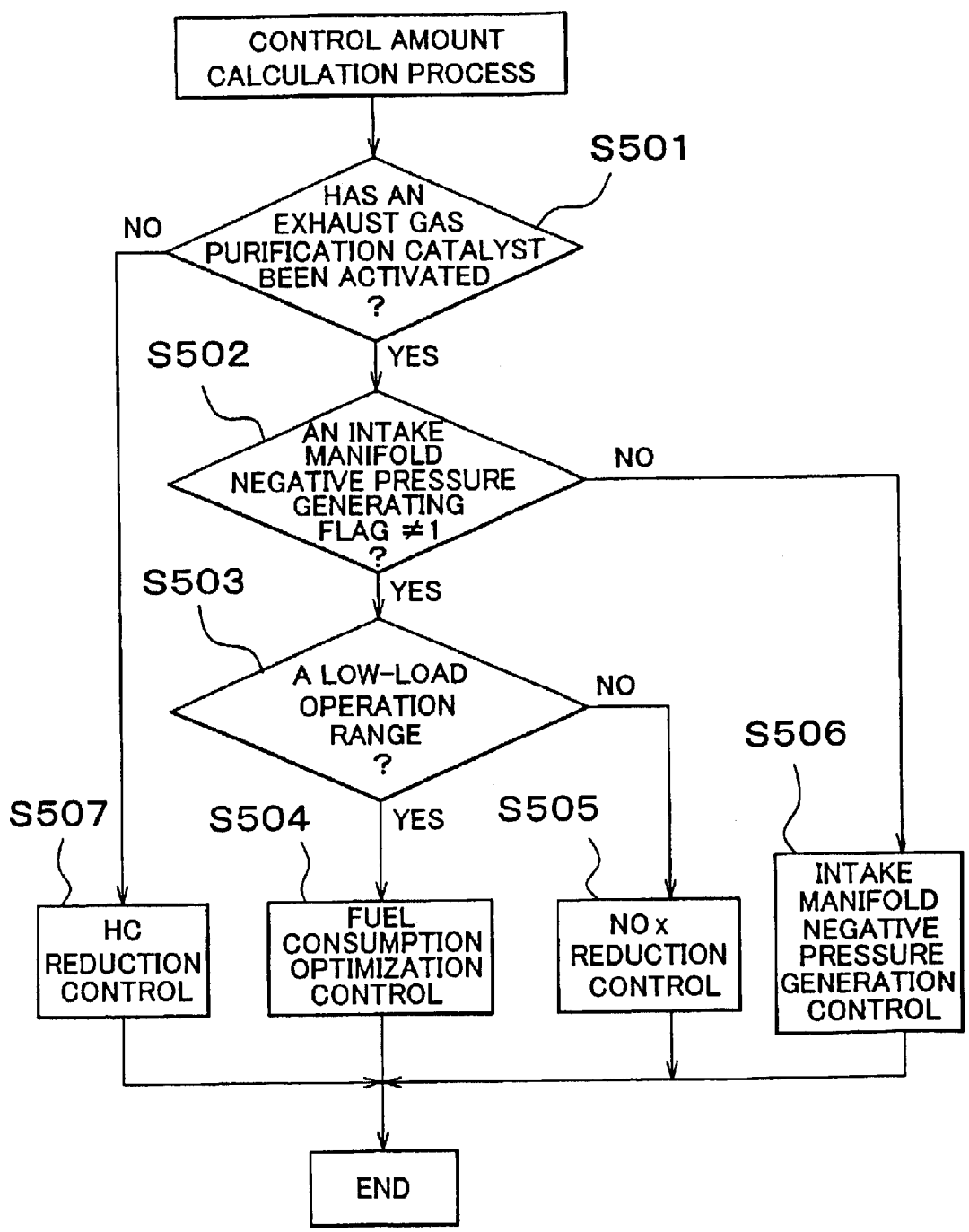
FIG. 5 is a flowchart showing a control amount calculation processing routine, according to one exemplary embodiment of this invention.

In various exemplary embodiments, the E-ECU 20 determines control signal values for the intake-side valve mechanism 30, the exhaust-side valve mechanism 31, the fuel injection valve 32, the igniter 25a and the throttle actuator 40 according to a control signal value calculation processing routine as shown in FIG. 5.

In the control signal value calculation processing routine, the E-ECU 20 determines in S501 whether or not the exhaust gas purification catalyst 46 has already been activated.

The following methods can be employed to determine whether or not the exhaust gas purification catalyst 46 has been activated. For example, it is determined that the exhaust gas purification catalyst 46 has been activated if a predetermined time or more has elapsed since the starting of the internal combustion engine (E/G) 1. Alternatively, it is determined that the exhaust gas purification catalyst 46 has been activated if the accumulated amount of intake air since the starting of the internal combustion engine (E/G) 1 has become equal to or greater than a predetermined value. Alternatively, a catalyst temperature sensor outputting an electric signal corresponding to the floor temperature of the exhaust gas purification catalyst 46 is mounted to the exhaust gas purification catalyst 46, and it is determined that the exhaust gas purification catalyst 46 has been activated if the output signal value of the catalyst temperature sensor (a catalyst floor temperature) has become equal to or higher than an activation temperature.

If it is determined in S501 that the exhaust gas purification catalyst 46 has been activated, the E-ECU 20 proceeds to S502 to determine whether or not a flag "1" has been stored in an intake manifold negative pressure generating flag storage area set in a random access memory (RAM) of the E-ECU 20.

In the case where an intake manifold negative pressure needs to be generated in the surge tank 34, for example, in the case where a brake booster (not shown) needs to be supplied with a negative pressure or where fuel vapors generated in a fuel tank (not shown) need to be recirculated to the intake system of the internal combustion engine (E/G) 1, the flag "1" is stored in the intake manifold negative pressure generating flag storage area. If there is no need to generate an intake manifold negative pressure in the surge tank 34, a flag "0" is stored in the intake manifold negative pressure generating flag storage area.

If it is determined in S502 that the flag "1" has not been stored in the intake manifold negative pressure generating flag storage area, namely, that the flag "0" has been stored in the intake manifold negative pressure generating flag storage area, the E-ECU 20 proceeds to S503 to determine from the engine speed, the output signal value of the accelerator position sensor 43 (an accelerator opening degree) and the like whether or not the internal combustion engine (E/G) 1 is in its low-load operation range.

If it is determined in S503 that the internal combustion engine (E/G) 1 is in its low-load operation range, the E-ECU 20 proceeds to S504 to determine the control amounts for the intake-side valve mechanism 30, the exhaust-side valve mechanism 31, the throttle actuator 40, the fuel injection valve 32 and the igniter 25a so as to minimize the amount of fuel consumption in the internal combustion engine (E/G) 1, while satisfying the target cylinder torque.

That is, the E-ECU 20 determines the control amounts such that the air-fuel mixture burnt in the respective cylinders 21 has an air-fuel ratio indicating a state of excessive oxygen (a lean air-fuel ratio) and that exhaust gas is recirculated from the exhaust ports 27 to the intake ports 26 through the combustion chamber 24, namely, that the amount of internal EGR increases.

For example, the E-ECU 20 determines the control amounts for the intake-side valve mechanism 30, the exhaust-side valve mechanism 31, the throttle actuator 40, the fuel injection valve 32 and the ignition plug 25 in such a manner:

(1) that the throttle valve opening degree is set to a fully-open state to prevent the pumping loss of intake air;
(2) that the fuel injection amount is set to an amount corresponding to the target cylinder torque;
(3) that the ignition timing is set to a timing when the maximum torque is obtained (i.e. a timing corresponding to the highest efficiency of converting the combustion pressure generated by combustion of the mixture into the rotational torque of the crank shaft 23);
(4) that the timing for opening the intake valves is set to a timing when the amount of internal EGR increases (e.g. a relatively late timing suited to prevent the burnt gas remaining in the combustion chamber 24 in a preceding exhaust stroke from being blown out to the intake ports 26);
(5) that the timing for closing the intake valves is set to a timing corresponding to the highest filling efficiency within a range of stable combustion;
(6) that the timing for opening the exhaust valves is set to a timing when the combustion pressure generated by combustion of the mixture is effectively reflected upon the descending movement of the piston 22 (e.g. in the proximity of the exhaust bottom dead center); and
(7) that the timing for closing the exhaust valves is set to a timing when the amount of internal EGR increases (e.g. a relatively early timing suited to ensure that part of the burnt gas remains in the combustion chamber 24).

If it is determined in S503 that the internal combustion engine (E/G) 1 is not in its low-load operation range, namely, that the internal combustion engine (E/G) 1 is in its intermediate-to-high-load operation range, the E-ECU 20 proceeds to S505 to determine control amounts for the intake-side valve mechanism 30, the exhaust-side valve mechanism 31, the throttle actuator 40, the fuel injection valve 32 and the igniter 25a such that the temperature in the combustion chamber 24 of each of the cylinders 21 is reduced and that the amount of generation of nitrogen oxides (NOX) is thereby reduced.

That is, the E-ECU 20 increases the amount of internal EGR, sets the air-fuel ratio of the mixture to an air-fuel ratio indicating a state of excessive fuel (a rich air-fuel ratio), and determines the control amounts so as to reduce the compression ratio of each of the cylinders 21.

For example, the E-ECU 20 determines the control amounts for the intake-side valve mechanism 30, the throttle actuator 40, the fuel injection valve 32, the exhaust-side valve mechanism 31, the throttle valve and the ignition plug 25 in such a manner:

(1) that the opening degree of the throttle valve 39 is set to the minimum opening degree that can guarantee the minimum required amount of intake air;
(2) that the fuel injection amount is set to an amount corresponding to the target cylinder torque;
(3) that the ignition timing is set to a retarded timing so as to reduce the combustion pressure;
(4) that the timing for opening the intake valves 28 is set to a timing when the amount of internal EGR increases (e.g. a relatively late timing suited to prevent the burnt gas remaining in the combustion chamber 24 in a preceding exhaust stroke from being blown out to the intake ports 26);
(5) that the timing for closing the intake valves 28 is set to a timing when the compression ratio decreases (e.g. a late timing after the intake bottom dead center);
(6) that the timing for opening the exhaust valves 29 is set to a relatively early timing so as to discharge high-temperature burnt gas at an early stage; and
(7) that the timing for closing the exhaust valves 29 is set to a timing when the amount of internal EGR increases (e.g. a relatively early timing suited to ensure that part of the burnt gas remains in the combustion chamber 24).

If the vehicle speed has reached a predetermined upper limit value when the internal combustion engine (E/G) 1 is in its intermediate-to-high-load operation range, the E-ECU 20 may decreasingly correct the target cylinder torque such that the vehicle speed becomes equal to or lower than the upper limit value, and determine the control signal values for the intake-side valve mechanism 30, the exhaust-side valve mechanism 31, the throttle actuator 40, the fuel injection valve 32 and the igniter 25a in accordance with the corrected target cylinder torque.

If it is determined in S502 that the flag "1" is stored in the intake manifold negative pressure generating flag storage area, the E-ECU 20 proceeds to S506 to control the throttle actuator 40 such that a desired intake manifold negative pressure is generated in an intake passage downstream of the throttle valve 39 (the surge tank 34) and to determine the control amounts for the intake-side valve mechanism 30, the exhaust-side valve mechanism 31, the fuel injection valve 32 and the igniter 25a.

For example, the E-ECU 20 determines control amounts for the intake-side valve mechanism 30, the exhaust-side valve mechanism 31, the throttle actuator 40, the fuel injection valve 32 and the ignition plug 25 in such a manner:

(1) that the opening degree of the throttle valve 39 is set to an opening degree suited to obtain a required intake manifold negative pressure;
(2) that the fuel injection amount is set to an amount corresponding to the target cylinder torque;
(3) that the ignition timing is set to a timing suited to obtain the maximum torque;
(4) that the timing for opening the intake valves 28 is set to a timing when an intake manifold negative pressure tends to be generated (e.g. the intake top dead center);
(5) that the timing for closing the intake valves 28 is set to a timing when an intake manifold negative pressure tends to be generated (e.g. the intake bottom dead center);
(6) that the timing for opening the exhaust valves 29 is set to a timing corresponding to a high discharging efficiency and/or a high engine output (e.g. the exhaust bottom dead center); and (7) that the timing for closing the exhaust valves 29 is set to a timing corresponding to a high discharging efficiency and/or a high engine output (e.g. the exhaust top dead center).

In a so-called non-throttle operation control, wherein the timings for opening and closing the intake valves 28 and exhaust valves 29 are changed with the throttle valve 39, which is fixed to its fully-open position, so as to control the amount of intake air in the internal combustion engine (E/G) 1, the pressure in the surge tank 34 (the intake manifold pressure) is always approximately equal to the atmospheric pressure. Thus, if the timings for opening and closing the intake and exhaust valves 28 and 29 are controlled on the premise that the intake manifold pressure is approximately equal to the atmospheric pressure, the amount of intake air in the internal combustion engine (E/G) 1 can be made equal to a desired amount. However, in a case where it has become necessary to control the amount of intake air in the internal combustion engine (E/G) 1 by controlling the opening degree of the throttle valve 39 and the timings for opening and closing the intake and exhaust valves 28, 29, for example, in the case where it has become necessary to generate an intake manifold negative pressure, the timings for opening and closing the intake and exhaust valves 28 and 29 need to be controlled in accordance with the actual intake manifold pressure.

Hence, a pressure sensor is attached to the surge tank 34, and the E-ECU 20 can control the timings for opening and closing the intake and exhaust valves 28 and 29 based on the output signal value of the pressure sensor (the actual intake manifold pressure), in the case where it has become necessary to control the amount of intake air in the internal combustion engine (E/G) 1, by controlling the opening degree of the throttle valve 39 and the timings for opening and closing the intake and exhaust valves 28 and 29.

If it is determined in S501 that the exhaust gas purification catalyst 46 has not been activated, the E-ECU 20 proceeds to S507 to determine the control amounts for the intake-side valve mechanism 30, the exhaust-side valve mechanism 31, the throttle actuator 40, the fuel injection valve 32 and the igniter 25a so as to reduce the amount of unburnt fuel constituents (HC) contained in exhaust gas.

That is, the E-ECU 20 determines the control amounts such that the mixture demonstrates a lean air-fuel ratio, that a decrease in the intake manifold negative pressure promotes the atomization of fuel, and that the atmospheric temperatures in the intake manifold 33 and the intake ports 26 rise due to the back flow of exhaust gas.

For example, the E-ECU 20 determines the control amounts for the intake-side valve mechanism 30, the exhaust-side valve mechanism 31, the throttle actuator 40, the fuel injection valve 32 and the ignition plug 25 in such a manner:

(1) that the opening degree of the throttle valve 39 is set to the minimum opening degree that can guarantee the minimum required amount of intake air;

(2) that the fuel injection amount is set to an amount corresponding to the target cylinder torque;

(3) that the ignition timing is set to a timing suited to obtain the maximum torque;

(4) that the timing for opening the intake valves 28 is set to a timing corresponding to the highest flow rate of the intake air flowing from the intake ports 26 to the combustion chamber 24 (e.g. a latest timing that does not allow the pumping loss to exceed a permissible amount);

(5) that the timing for closing the intake valves 28 is set to a timing corresponding to the highest compression ratio (e.g. the intake bottom dead center);

(6) that the timing for opening the exhaust valves 29 is set to a relatively late timing so as to prolong the period for combustion of the mixture; and (7) that the timing for closing the exhaust valves 29 is set to a relatively late timing so as to ensure that part of the exhaust gas back-flows to the intake ports 26 and the intake manifold 33.

In the aforementioned control amount calculation processing routine, a HC-reducing process is performed to reduce the amount of unburnt fuel constituents contained in the exhaust gas if the exhaust gas purification catalyst 46 has not been activated. However, a catalytic warm-up process may be performed to activate the exhaust gas purification catalyst 46 at an early stage.

In the case of the catalytic warm-up process, the E-ECU 20 determines the control amounts for the intake-side valve mechanism 30, the exhaust-side valve mechanism 31, the throttle actuator 40, the fuel injection valve 32 and the ignition plug 25, for example, such that the exhaust gas discharged from each of the cylinders 21 reaches a high temperature.

For example, the E-ECU 20 can determine the control amounts for the intake-side valve mechanism 30, the exhaust-side valve mechanism 31, the throttle actuator 40, the fuel injection valve 32 and the ignition plug 25 in such a manner:

(1) that the opening degree of the throttle valve 39 is set to an opening degree that can guarantee the maximum amount of intake air within a range of stable combustion of the mixture;

(2) that the fuel injection amount is set to an amount corresponding to the target cylinder torque;

(3) that the ignition timing is set to the most retarded timing within a range of stable combustion of the mixture;

(4) that the timing for opening the intake valves 28 is set to a timing corresponding to a small amount of EGR;

(5) that the timing for closing the intake valves 28 is set to a timing close to the intake bottom dead center;

(6) that the timing for opening the exhaust valves 29 is set to a relatively early timing so as to discharge high-temperature burnt gas; and (7) that the timing for closing the exhaust valves 29 is set to a timing corresponding to the minimum amount of the burnt gas remaining in the combustion chamber 24.

The E-ECU 20 performs the control amount calculation processing routine as shown in FIG. 5, whereby a valve timing determiner, a fuel injection timing determiner and a intake throttle valve opening degree determiner according to the invention are realized.

Referring again to FIG. 4, after the step of calculating the control signal values in S404, the E-ECU 20 proceeds to S405 to control the intake-side valve mechanism 30, the exhaust-side valve mechanism 31, the fuel injection valve 32 and the igniter 25a for each of the operative cylinders 21 and the throttle actuator 40 in accordance with the control signal values determined in S404. In addition, the E-ECU 20 controls the intake-side valve mechanism 30, the exhaust-side valve mechanism 31, the fuel injection valve 32 and the igniter 25a for each of the inoperative cylinders 21 such that the intake and exhaust valves 28, 29 are fully closed and that the fuel injection valve 32 and the ignition plug 25 become inoperative.

The E-ECU 20 thus performs the individual-cylinder torque control process as shown in FIG. 4, whereby the target cylinder torque calculator and the valve controller according to the invention are realized.

In the aforementioned exemplary embodiment, since the timings for opening and closing the intake and exhaust valves 28 and 29 can be separately controlled for each of the cylinders, it is possible to control the torque of the internal combustion engine (E/G) 1 individually for each of the cylinders.

Figure 6:
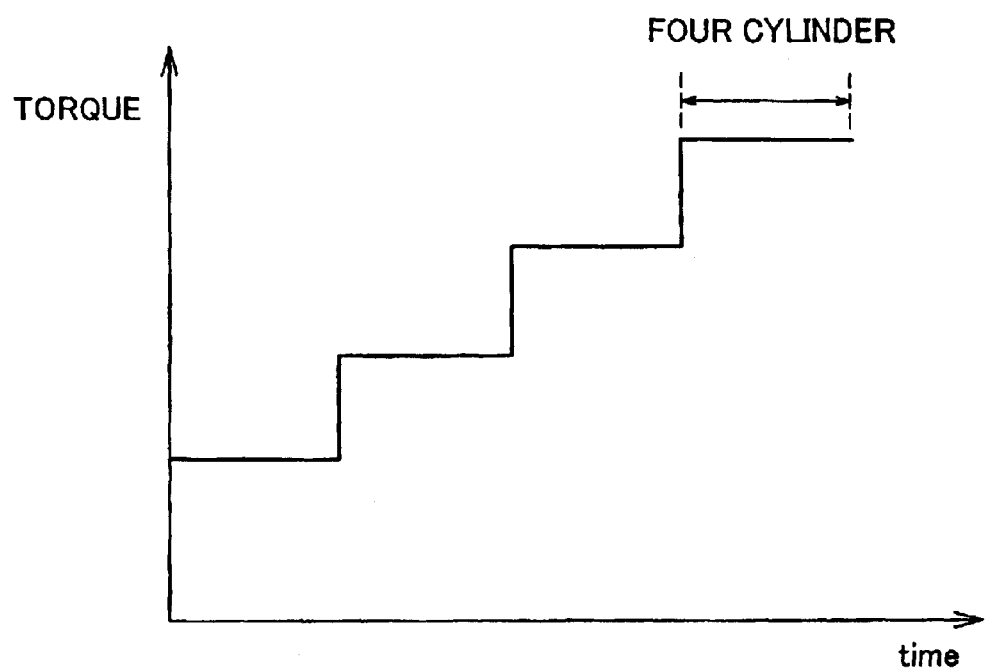
FIG. 6 shows changes in the torque when all the cylinders are subjected to torque control altogether, according to one exemplary embodiment of this invention.
Figure 7:
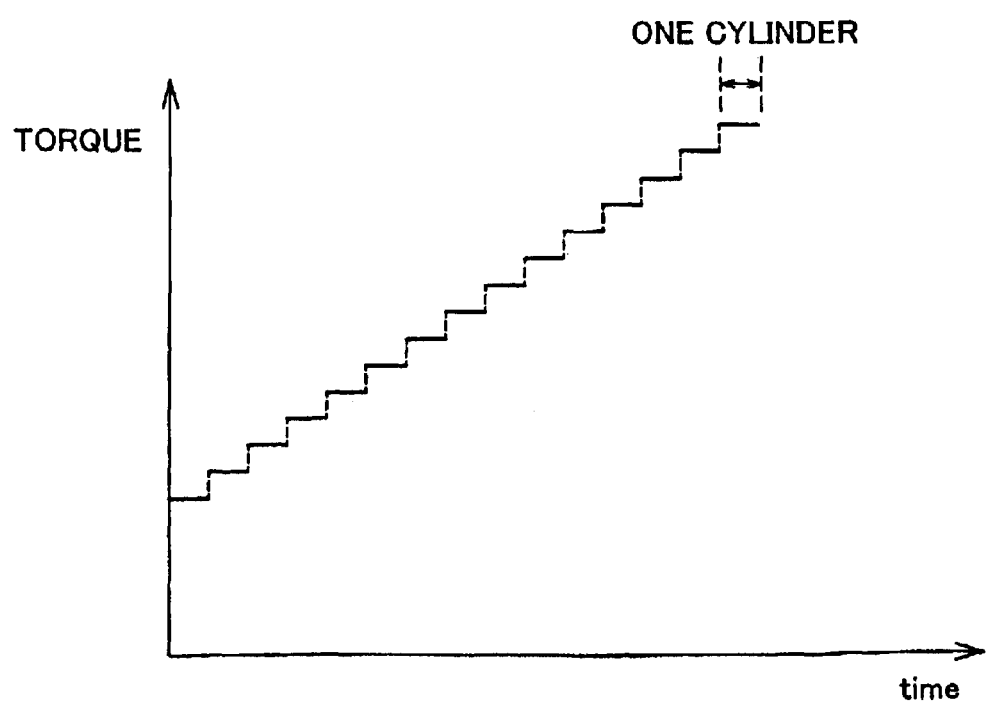
FIG. 7 shows changes in the torque when the cylinders are subjected to torque control individually, according to one exemplary embodiment of this invention.

According to such control, if the torques in all the cylinders 21 are increased simultaneously, for example in an attempt to increase the torque of the internal combustion engine (E/G) 1, the torque of the internal combustion engine (E/G) 1 increases gradually as shown in FIG. 6. However, if the torque is increased individually for each of the cylinders 21, it is possible to increase the torque of the internal combustion engine (E/G) 1 relatively linearly as shown in FIG. 7 and improve the driveability.

Moreover, in this embodiment, the target cylinder torque is calculated in consideration of the inertia torque of the internal combustion engine (E/G) 1, the inertia torque of the continuously variable transmission (CVT) 102, and the acceleration-deceleration shock absorbing torques. Therefore it becomes possible to curb the generation of an acceleration-deceleration shock resulting from the gear-change operation or the inertia torque of the continuously variable transmission (CVT) 102 and further improve the driveability.

In this exemplary embodiment, the fuel injection amount, the throttle valve opening degree and the ignition timing as well as the timings for opening and closing the intake and exhaust valves 28 and 29 are controlled in realizing the target cylinder torque. This makes it possible to further enhance the precision in performing torque control of the internal combustion engine (E/G) 1.

Although the aforementioned exemplary embodiment handles an example in which the target cylinder torque is set individually for each of the cylinders 21, this exemplary embodiment handles an example in which the target cylinder torque for one cylinder is set at an arbitrary timing.

In the case where the target cylinder torques are set individually for all the cylinders 21, the setting of the target cylinder torque needs to be carried out a plurality of times equaling the number of the cylinders during one cycle, (while the crank shaft 23 rotates by 720° C.A). This requires a high computing load of the E-ECU 20. Especially during high-speed operation wherein the crank shaft 23 rotates at a high speed, the computing load of the E-ECU 20 per unit time is increased significantly.

In view of the circumstance, according to this exemplary embodiment, the target cylinder torque for one cylinder is set at an arbitrary timing, and the target cylinder torque thus set is allocated to an appropriate one of the cylinders 21 (e.g. the one that first goes through an intake stroke).

Figure 8:
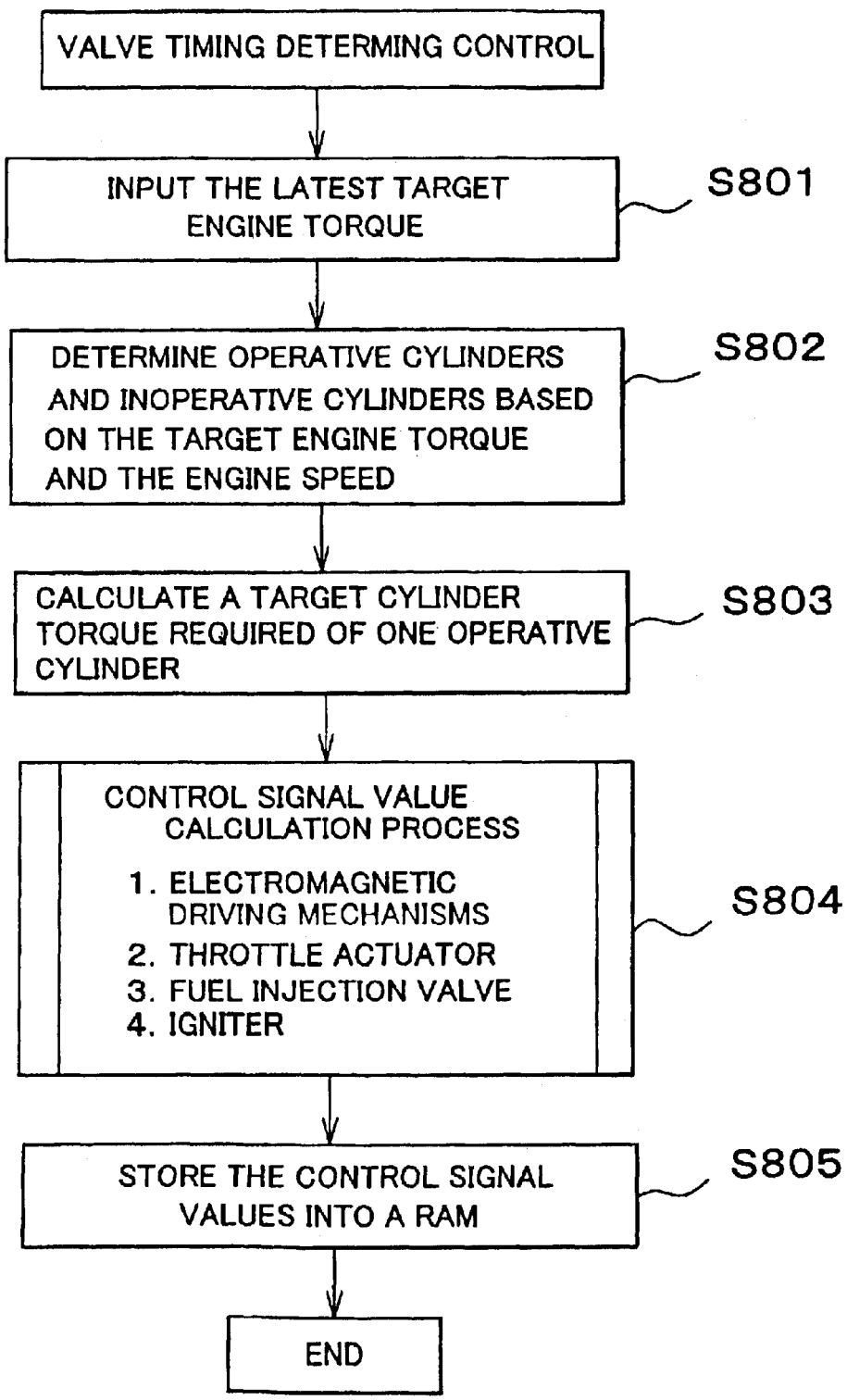
FIG. 8 is a flowchart showing a valve timing determining control process according to another embodiment of this invention.

More specifically, the E-ECU 20 executes a valve timing determining control process as shown in FIG. 8. This valve timing determining control process is repeatedly executed at intervals of a predetermined period.

For example, the predetermined period may be set to a constant period that is determined out of synchronization with the operation cycle of the internal combustion engine (E/G) 1 and that is shorter than a period required for the crank shaft 23 to rotate by 720° C.A when the internal combustion engine (E/G) 1 operates at a high speed.

In the valve timing determining process, the E-ECU 20 retrieves in step S801 the engine speed of the internal combustion engine (E/G) 1 and the latest engine torque calculated through cooperation control with the CVT-ECU 200 referenced in the aforementioned exemplary embodiment.

In S802, the E-ECU 20 determines the operative and the inoperative cylinders of the cylinders 21 according to the target engine torque retrieved in S801.

In S803, the E-ECU 20 calculates the target cylinder torque required for each of the operative cylinders 21.

In S804, the E-ECU 20 determines, for one of the cylinders, the control signal values for the intake-side valve mechanism 30, the exhaust-side valve mechanism 31, the fuel injection valve 32, the igniter 25*a* and the throttle actuator 40 according to the target cylinder torque calculated in S803.

The method of calculating control signal values for the intake-side valve mechanism 30, the exhaust-side valve mechanism 31, the fuel injection valve 32, the igniter 25*a* and the throttle actuator 40 is identical to that of the aforementioned exemplary embodiment and therefore will not be described below.

In S805, the E-ECU 20 stores the control signal values calculated in S804 in the RAM built into the E-ECU 20, and then terminates the process.

If the E-ECU 20 executes the valve timing determining control process, the control signal values stored in the RAM are updated at intervals of a predetermined period.

The E-ECU 20 executes the individual-cylinder torque control process as shown in FIG. 9, separately from the aforementioned valve timing determining control process. This individual-cylinder torque control process is executed at intervals of a predetermined period that is in synchronization with the operation cycle of the internal combustion engine (E/G) 1 (e.g. every time the crank position sensor 51 outputs a predetermined number of pulse signals).

In the individual-cylinder torque control process, the E-ECU 20 detects, in S901, the actual rotational position of the crank shaft 23 (actual crank angle) based on the output signal from the crank position sensor 51.

In S902, the E-ECU 20 compares the actual crank angle detected in S901 with valve timing determining phases for all the cylinders 21 (represented by crank angles), and determines whether or not there is a cylinder 21 that has a valve timing determining phase that coincides with the actual crank angle.

The valve-timing determining timing is determined in advance for each of the cylinders 21. For example, it is set to a timing preceding the timing when each of the cylinders 21 goes through an intake stroke (an exhaust stroke or an expansion stroke).

If it is determined in S902 that there is no cylinder 21 that has a valve timing determining phase that coincides with the actual crank angle, the E-ECU 20 temporarily terminates the execution of the process.

On the other hand, if it is determined in S902 that there is a cylinder 21 having a valve timing determining phase that coincides with the actual crank angle, the E-ECU 20 proceeds to S903.

In S903, the E-ECU 20 determines whether the cylinder 21 having a valve timing determining phase has been determined in S902 to coincide with the actual crank angle is the operative cylinder 21 or the inoperative cylinder 21.

If it is determined in S903 that the cylinder 21 whose valve timing determining phase coincides with the actual crank angle is the inoperative cylinder 21, the E-ECU 20 proceeds to S906 to perform a stop control for stopping the operation of the inoperative cylinder 21.

In performing the stop control, in the case where the inoperative cylinder 21 is not to be operated by a pump, the E-ECU 20 controls the intake-side valve mechanism 30 and the exhaust-side valve mechanism 31, for example, so as to keep at least either the intake valves 28 or the exhaust valves 29 fully closed, and controls the fuel injection valve 32 and the igniter 25a so as to prohibit fuel injection and ignition.

In the case where the inoperative cylinder 21 is to be operated by the pump, the E-ECU 20 controls the intake-side valve mechanism 30 and the exhaust-side valve mechanism 31, for example, such that the intake valves 28 are opened in an intake stroke of the inoperative cylinder 21 and that the exhaust valves 29 are opened in an exhaust stroke of the inoperative cylinder 21, and controls the fuel injection valve 32 and the igniter 25a so as to prohibit fuel injection and ignition.

As soon as step S906 is completed, the E-ECU 20 temporarily terminates the execution of the process.

On the other hand, if it is determined in S903 that the cylinder 21 having a valve timing determining phase coincides with the actual crank angle is the operative cylinder 21, the E-ECU 20 proceeds to S904 to retrieve from the RAM the latest control signal values determined by the aforementioned valve timing determining control process. The process proceeds to S905.

In S905, the E-ECU 20 controls the intake-side valve mechanism 30, the exhaust-side valve mechanism 31, the fuel injection valve 32 and the ignition plug 25 of the operative cylinder 21 according to the control signal values retrieved in S904, and controls the throttle actuator 40 according to the control signal value retrieved in S904.

As soon as step in S905 is completed, the E-ECU 20 temporarily terminates the execution of the process.

If the E-ECU 20 executes the individual-cylinder torque control process, the target cylinder torque for one cylinder, which has been set out of synchronization with the operation cycle of the internal combustion engine (E/G) 1, is allocated to a relevant one of the cylinders 21.

Thus, according to this exemplary embodiment, the E-ECU 20 has only to set the target cylinder torque for one cylinder at intervals of a period that is out of synchronization with the operation cycle of the internal combustion engine (E/G) 1. Thereby it becomes possible to reduce the computing load of the E-ECU 20.

By optimizing the intervals at which valve timing determining control is performed, it is also possible, for example, to perform valve timing determining control a plurality of times equaling in number to the number of the cylinders during one cycle in a low-speed operation range where a great length of time is required for one cycle, and once or twice during one cycle in a high-speed operation range where a short length of time is required for one cycle.

In this case, the torque of the internal combustion engine (E/G) 1 is controlled individually for each of the cylinders in the low-speed operation range, whereas the torque of the internal combustion engine (E/G) 1 is controlled altogether for a plurality of cylinders in the high-speed operation range.

The cylinders are ignited at shorter intervals in the high-speed operation range than in the low-speed operation range. Therefore, even if the torque of the internal combustion engine (E/G) 1 is controlled altogether for a plurality of cylinders, the driveability of the vehicle does not deteriorate.

In the illustrated embodiments, the main controller, the first controller 200 and the second controller 20 are implemented as a programmed general purpose computer. It will be appreciated by those skilled in the art that the controller can be implemented using single special purpose integrated circuits (e.g., ASIC) having a main or central processor section for overall, system-level control, and separate sections dedicated to performing various different specific computations, functions and other processes under control of the central processor section. The respective controllers can each be a plurality of separate dedicated or programmable integrated or other electronic circuits or devices (e.g., hardwired electronic or logic circuits such as discrete element circuits, or programmable logic devices such as PLDs, PLAs, PALs or the like). The respective controllers can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controllers. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. An internal combustion engine comprising:

electromagnetic driving valve mechanisms that drive at least one of intake and exhaust valves of the internal combustion engine in their opening and closing directions by means of an electromagnetic force;

a transmission capable of changing a gear change ratio;

a valve controller that controls opening characteristics of at least one of the intake and exhaust valves in association with operation states of at least one of the electromagnetic driving valve mechanisms and the transmission;

a determining portion that determines a torque schedule of the internal combustion engine based on a target engine torque required of the internal combustion engine and an accelaration-deceleration shock absorbing torque; and a target cylinder torque calculator that calculates a target cylinder torque of cylinders of the internal combustion engine in accordance with the torque schedule, wherein the valve controller controls opening characteristics of at least one of the intake and exhaust valves based on the target cylinder torque.

2. The internal combustion engine according to claim 1, wherein the transmission is an automatic transmission that has an inertia torque and that is capable of changing a gear change ratio automatically.

3. The internal combustion engine according to claim 1, wherein the transmission is a continuously variable transmission that has an inertia torque and that is capable of changing a gear change ratio continuously and non-stepwise.

4. The internal combustion engine according to claim 1, wherein the target cylinder torque calculator calculates the target cylinder torque of cylinders of the internal combustion engine in accordance with the target engine torque required of the internal combustion engine, and wherein the valve controller adds the target cylinder torque calculated by the target cylinder torque calculator to the acceleration-deceleration shock absorbing torque, determines the torque schedule of the internal combustion engine, and controls opening characteristics of the at least one of the intake and exhaust valves based on the torque schedule.

5. The internal combustion engine according to claim 1, wherein the opening characteristics are opening and closing timings of at least one of the intake and exhaust valves.

6. A method of controlling at least one of intake and exhaust valves of an internal combustion engine, comprising:

driving the at least one of intake and exhaust valves in their opening and closing directions using electromagnetic driving valve mechanisms operated by means of an electromagnetic force;

controlling opening characteristics of the at least one of the intake and exhaust valves in association with operation states of the at least one of the electromagnetic driving valve mechanisms and a transmission that is capable of changing a gear ratio;

determining a torque schedule of the internal combustion engine based on a target engine torque required of the internal combustion engine and an acceleration-deceleration shock absorbing torque; and calculating a target cylinder torque of cylinders of the internal combustion engine in accordance with the torque schedule, wherein the controlling opening characteristics of the at least one of the intake and exhaust valves is based on the target cylinder torque.

7. An internal combustion engine comprising:

valve mechanisms that drive at least one of intake and exhaust valves of the internal combustion engine in their opening and closing directions by means of an electromagnetic force;

a transmission capable of changing a gear change ratio;

a valve controller that controls opening characteristics of at least one of the intake and exhaust valves in association with operation states of at least one of the valve mechanisms and the transmission;

a determining portion that determines a torque schedule of the internal combustion engine based on a target engine torque required of the internal combustion engine and an acceleration-deceleration shock absorbing torque; and a target cylinder torque calculator that calculates a target cylinder torque of cylinders of the internal combustion engine in accordance with the torque schedule, wherein the valve controller controls opening characteristics of at least one of the intake and exhaust valves based on the target cylinder torque.

* * * * *